US008413993B2

(12) United States Patent
Brück et al.

(10) Patent No.: US 8,413,993 B2
(45) Date of Patent: Apr. 9, 2013

(54) SEALING RING FOR TURBO ENGINES

(75) Inventors: Stefan Brück, Mülheim an der Ruhr (DE); Eduard Jenikejew, Mülheim an der Ruhr (DE); Matthias Neef, Mülheim an der Ruhr (DE); Norbert Sürken, Mülheim a.d. Ruhr (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 12/594,494

(22) PCT Filed: Apr. 1, 2008

(86) PCT No.: PCT/EP2008/053875

§ 371 (c)(1), (2), (4) Date: Oct. 2, 2009

(87) PCT Pub. No.: WO2008/119800

PCT Pub. Date: Oct. 9, 2008

(65) Prior Publication Data

US 2010/0164181 A1 Jul. 1, 2010

(30) Foreign Application Priority Data

Apr. 3, 2007 (DE) ........................ 10 2007 016 104

(51) Int. Cl.
*F16J 15/447* (2006.01)

(52) U.S. Cl. ........................ 277/413; 277/416; 277/421

(58) Field of Classification Search .................. 277/411, 277/412, 413, 416, 421
See application file for complete search history.

(56) References Cited

U.S. PATENT DOCUMENTS

| | | | | |
|---|---|---|---|---|
| 5,395,124 | A * | 3/1995 | Brandon | 277/413 |
| 5,464,226 | A * | 11/1995 | Dalton | 277/412 |
| 5,810,365 | A * | 9/1998 | Brandon et al. | 277/416 |
| 5,934,684 | A | 8/1999 | Brandon | |
| 6,220,603 | B1 | 4/2001 | Brandon | |
| 6,651,986 | B2 * | 11/2003 | Chevrette et al. | 277/421 |
| 7,052,017 | B2 * | 5/2006 | Uchida et al. | 277/420 |
| 2003/0057653 | A1 | 3/2003 | Chevrette | |
| 2003/0141669 | A1 * | 7/2003 | Chevrette et al. | 277/421 |

FOREIGN PATENT DOCUMENTS

| | | | |
|---|---|---|---|
| EP | 1243755 | A1 | 9/2002 |
| GB | 1275581 | A | 5/1972 |

* cited by examiner

*Primary Examiner* — Gilbert Lee

(57) ABSTRACT

A sealing ring for turbo engines is provided. The sealing ring includes individual sealing segments, between which springs are mounted. Locking elements are provided on the parting joint of the turbo engine to retain the sealing segments. In order to ensure that the sealing elements can be securely closed on the parting joint, the sealing segments are positively interconnected on the parting joint.

2 Claims, 2 Drawing Sheets

SEALING RING FOR TURBO ENGINES

CROSS REFERENCE TO RELATED APPLICATIONS

This application is the U.S. National Stage of International Application No. PCT/EP2008/053875, filed Apr. 1, 2008 and claims the benefit thereof. The International Application claims the benefits of European application No. 10 2007 016 104.4 DE filed Apr. 3, 2007, both of the applications are incorporated by reference herein in their entirety.

FIELD OF INVENTION

The present invention refers to a sealing ring for turbomachines, which is assembled from individual sealing segments, wherein springs are installed between the individual sealing segments and locking elements for retaining the sealing segments are provided at the parting joint of the turbomachine.

BACKGROUND OF THE INVENTION

In rotating turbomachines, sealing elements of various types of construction are used for sealing different pressurized spaces. In the case of sealing between rotating and stationary machine components special sealing elements, which are movable in the radial direction and therefore can yield in the case of rotor vibrations or rotor deflections, are frequently used.

In this case, a distinction is essentially made between spring-type sealing segments, wherein springs press the sealing elements radially in the direction of the shaft, or so-called "retractable seals". In this case, the springs are arranged between the segments so that a ring of sealing elements is pressed away from the shaft and only close as a result of the pressure drop across the place which is to be sealed during operation of the machine.

The technology with "retractable seals" is especially recommended for turbines in which during the starting and shutdown processes large relative movement between rotor and casing is to be expected. In this operating phase, the sealing elements are then sufficiently far away from the rotor, close at a specific pressure, and fulfill their function as sealing elements during operating conditions. In this case, the faultless and predictable function of the closing of the segments is important.

This function is especially hindered as a result of locking elements which are installed at the parting joint of the turbomachine and are necessary in order to secure at least the sealing segments which are arranged in the upper section of the casing of the turbomachine from falling out during installation.

SUMMARY OF INVENTION

In order to also ensure closing of the sealing segments at the parting joint where the sealing segments, in addition to contact faces in the locating joint, rub on a locking element in the parting joint, an adequate safety margin when rating the closing pressure is simply taken into consideration at the time. With a specific pressure difference, the friction is overcome and the segments close.

It is the object of the present invention to disclose a sealing ring of the type referred to in the introduction, in the case of which the closing behavior is significantly improved.

This object is achieved for the sealing ring which is referred to in the introduction by the sealing segments being interconnected in a form-fitting manner at the parting joint.

The closing behavior can be significantly improved if the sealing segments at the parting joint are constructed so that adjacent sealing segments in the upper and lower sections of the casing of the turbomachine interlock after installation.

In the case of a radial movement, the segments then act as one segment. As a result of the form-fitting connection of the sealing segments at the parting joint, the difference between the starting pressure, at which the first sealing segments move, and the closing pressure, at which the sealing ring is completely closed, is reduced and fretting during closing of the segments at the parting joint is avoided.

In the case of the sealing ring according to the invention, the sealing segment, which to start with moves without rubbing at the parting joint, carries along the other sealing segment. As a result, the friction force at the parting joint is distributed between two sealing segments. It can be shown that as a result of this the difference between beginning and end of the closing process compared with the known construction can be reduced by 30%.

An expedient development of the sealing ring according to the present invention is characterized in that the one end of the sealing segment at the parting joint has a projecting cylindrical pin which extends in the axial direction of the turbomachine and fits into a corresponding recess at the end of the adjacent sealing segment. This constitutes a particularly simple development.

BRIEF DESCRIPTION OF THE DRAWINGS

An exemplary embodiment of a sealing ring according to the invention is subsequently described with reference to the attached drawing.

In the drawing.

DETAILED DESCRIPTION OF INVENTION

Figure 1:
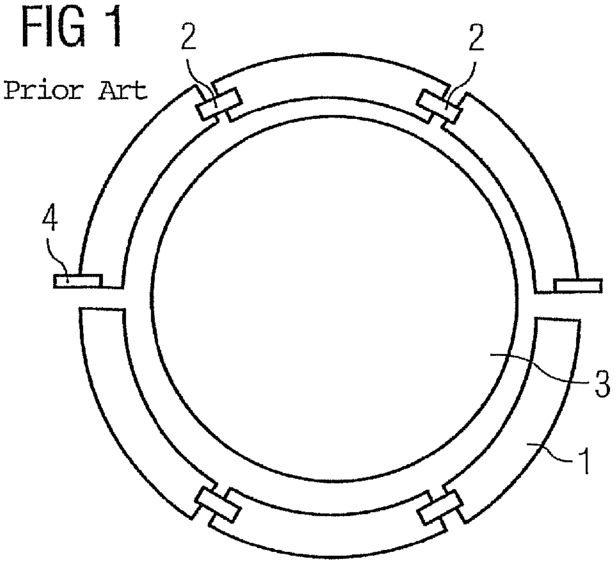
FIG 1 Prior Art
FIG. 1 shows the principle of the "retractable seals" technology.

FIG. 1 shows the principle of a sealing ring according to the "retractable seals" technology. The individual sealing segments, which are pressed apart by springs 2 in the neutral position, are designated 1. The rotor 3 is located inside the sealing ring which is shown. The locking elements 4 are provided at the parting joint of the casing of the turbomachine.

Figure 2:
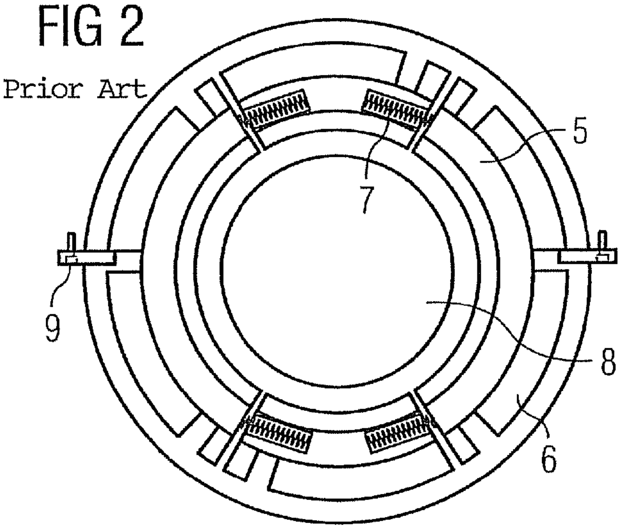
FIG 2 Prior Art
FIG. 2 shows a known embodiment of a sealing ring according to the "retractable seals" technology.

FIG. 2 shows a known embodiment in which the sealing segments 5, 6 are pressed apart by means of spring 7 and are retained at the parting joint of the casing of the turbomachine by means of the locking elements 9. The rotor 8 is located inside the sealing ring.

Figure 3:
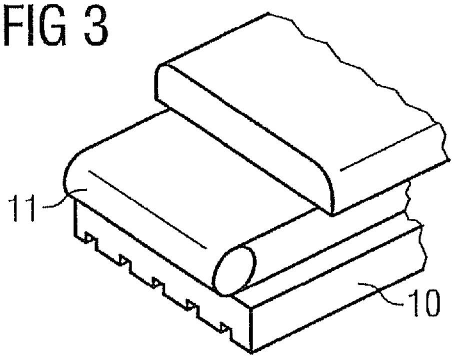
FIG. 3 shows a perspective view of the end of a sealing segment at the parting joint according to the present invention, FIG. 4 and FIG. 5 schematically show the closing of sealing segments in the case of a known embodiment of the sealing ring, and FIG. 6 and FIG. 7 schematically show the closing of the sealing segments at the parting joint in the case of a sealing ring according to the present invention.

FIG. 3 shows a perspective view of one end of a sealing segment at the parting joint according to the present invention. In the case of the embodiment which is shown here, the one end of the sealing segment is constructed at the parting joint with a projecting cylindrical pin 11 which fits into a corresponding recess (FIG. 6, the projecting pin 11, is in the corresponding recess) at the end of the adjacent sealing segment 13. Any other form-fitting connection is conceivable, however, in which the parts are commonly guided in their radial movement but the pressing apart in the circumferential direction is not hindered.

Figure 4:
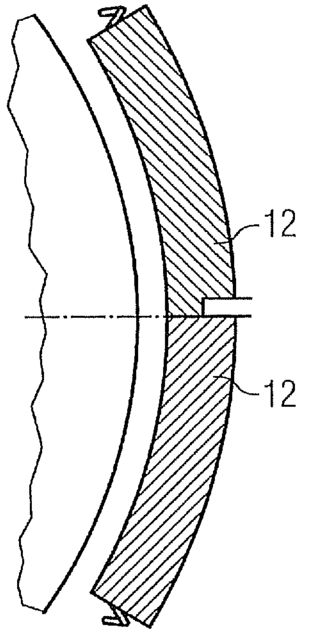
FIG 4 Prior Art
Figure 5:
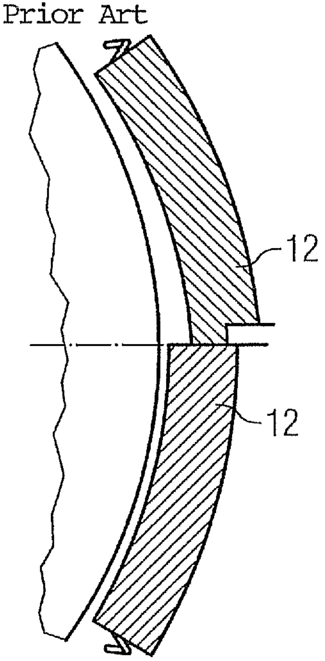
FIG 5 Prior Art
Figure 6:
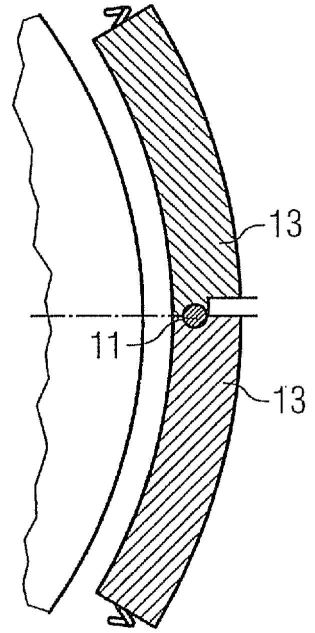
Figure 7:
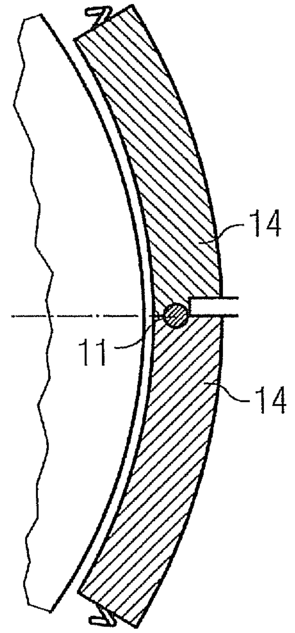

FIG. 4 and FIG. 5 show the movement of the sealing segments at the parting joint in a known embodiment, and FIG. 6 and FIG. 7 show the movement of the sealing segments at the parting joint according to a sealing ring which is formed according to the present invention.

FIG. 4 and FIG. 6 show in each case the state before the closing of the sealing ring, and FIGS. 5 and 7 schematically show in each case the state after the closing of the sealing ring.

It is to be seen that in the case of the known embodiment of the sealing ring the radial movement of the sealing segments 12 at the parting joint is different, while in the case of the sealing ring according to the present invention a common radial movement of the sealing segments 13, 14 at the parting joint of the casing of the turbomachine takes place.

In conclusion, the advantages of the sealing ring according to the invention shall be summarized once more:

Faster closing of the segments, therefore smaller pressure range, in which a movement of the sealing segments takes place Altogether lower pressure differences, starting from which the "retractable seals" technology is operable Homogenization of the closing process, no sharp differences at the parting joint between upper section and lower section of the casing of the turbomachine Reduced rubbing at the parting joint, consequently a reduction of the risk of fretting

The invention claimed is:

1. A sealing ring for turbomachines, comprising:

a plurality of individual sealing segments; and a plurality of springs, wherein the plurality of springs are installed between the plurality of individual sealing segments, and wherein a plurality of locking elements are provided at a parting joint of the turbomachine for retaining the plurality of sealing segments, and wherein the plurality of individual sealing segments are interconnected in a form-fitting manner at the parting joint, wherein one end of an individual sealing segment at the parting joint includes a projecting cylindrical pin such that the parting joint and the projecting cylindrical pin are one piece, wherein the cylindrical pin extends in an axial direction of the turbomachine and fits into a corresponding recess at an end of an adjacent sealing segment such that the projecting cylindrical pin in the sealing segment and the adjacent sealing segment with the corresponding recess are mating pairs.

2. The sealing ring as claimed in claim 1, wherein a difference between a starting pressure when the plurality of individual sealing segments move and a closing pressure when the sealing ring is completely closed is reduced.

* * * * *